United States Patent
Tang

(10) Patent No.: US 8,040,628 B2
(45) Date of Patent: Oct. 18, 2011

(54) SYNCHRONOUS WRITING WITH TIMING ERROR DETECTION IN BIT PATTERNED MEDIA DISK DRIVES

(75) Inventor: Yawshing Tang, Saratoga, CA (US)

(73) Assignee: Samsung Electronics Co., Ltd., Suwon (KR)

(*) Notice: Subject to any disclaimer, the term of this patent is extended or adjusted under 35 U.S.C. 154(b) by 172 days.

(21) Appl. No.: 12/261,557

(22) Filed: Oct. 30, 2008

(65) Prior Publication Data
US 2010/0110573 A1  May 6, 2010

(51) Int. Cl.
*G11B 5/09* (2006.01)
*G11B 27/36* (2006.01)
*G11B 21/02* (2006.01)
(52) U.S. Cl. ............... 360/51; 360/31; 360/75
(58) Field of Classification Search .......... None
See application file for complete search history.

(56) References Cited

U.S. PATENT DOCUMENTS

| | | | | |
|---|---|---|---|---|
| 6,803,828 B2* | 10/2004 | Tan et al. | ......... | 331/17 |
| 6,839,195 B2* | 1/2005 | Chainer et al. | ......... | 360/51 |
| 7,675,703 B2* | 3/2010 | Albrecht et al. | ......... | 360/51 |
| 7,808,737 B2* | 10/2010 | Tsukada et al. | ......... | 360/51 |
| 7,817,365 B2* | 10/2010 | Fisher | ......... | 360/51 |
| 2009/0091854 A1* | 4/2009 | Tang | ......... | 360/51 |
| 2010/0020429 A1* | 1/2010 | Sridhara et al. | ......... | 360/51 |

\* cited by examiner

*Primary Examiner* — Daniell L Negron
*Assistant Examiner* — Regina N Holder

(57) ABSTRACT

A hard disk drive that includes a head that is coupled to a disk. The disk drive further includes a comparator circuit that is coupled to the head. The comparator circuit receives a synchronization signal and a write clock. The comparator generates a write error signal if a comparison of the synchronization and write clock signals exceeds a threshold. The write error signal can inhibit a write operation or cause a rewrite of data.

15 Claims, 3 Drawing Sheets

SYNCHRONOUS WRITING WITH TIMING ERROR DETECTION IN BIT PATTERNED MEDIA DISK DRIVES

BACKGROUND OF THE INVENTION

1. Field of the Invention

The present invention relates to detection of head jitter in a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

The disks are rotated by a spindle motor of the drive. Rotation of the disks creates an air flow within the disk drive. Each head has an air bearing surface that cooperates with the air flow to create an air bearing between the head and the adjacent disk surface. The air bearing eliminates or minimizes the mechanical wear between the head and the disk. The height of the air bearing is commonly referred to as the flying height of the head.

The magnetic field detected by the head is inversely proportional to the flying height of the head. Likewise, the strength of the magnetic field written onto the disk is also inversely proportional to the fly height. A larger fly height will produce a weaker magnetic field on the disk.

There have been developed disk media that have patterns of magnetic dots. Such disks are commonly referred to as bit patterned media. The dots are constructed from magnetic material and are separated from each other by non-magnetic material. The non-magnetic materials inhibits cross-talk between the dots. The write clock must be very accurate so that the writing of data occurs above a magnetic dot.

It is desirable to create a flying height that is nearly zero. A nearly zero flying height can result in contact between the head and disk. Contact between the head and the disk can cause vibration and associated head movement. Such movement can destroy synchronization between the write clock and the writing of data in a bit pattern media. It is therefore desirable to detect vibration induced movement of the heads.

BRIEF SUMMARY OF THE INVENTION

A hard disk drive that includes a head that is coupled to a disk. The disk drive further includes a comparator circuit that is coupled to the head. The comparator circuit receives a synchronization signal and a write clock. The comparator generates a write error signal if a comparison of the synchronization and write clock signals exceeds a threshold.

DETAILED DESCRIPTION

Disclosed is a hard disk drive that includes a head that is coupled to a disk. The disk drive further includes a comparator circuit that is coupled to the head. The comparator circuit receives a synchronization signal and a write clock. The comparator generates a write error signal if a comparison of the synchronization and write clock signals exceeds a threshold. The write error signal can inhibit a write operation or cause a rewrite of data.

Figure 1:
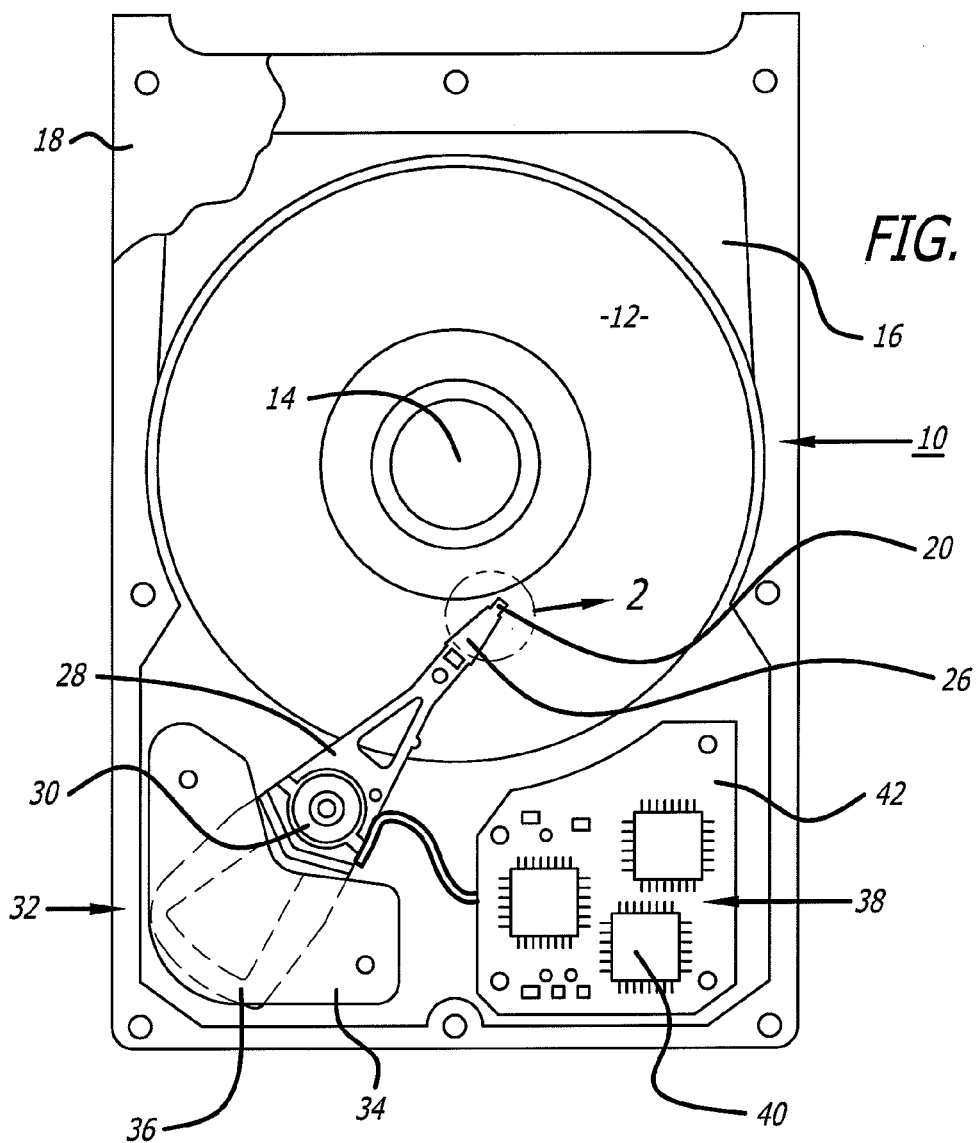
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12. The disks 12 may be bit patterned media.

Figure 2:
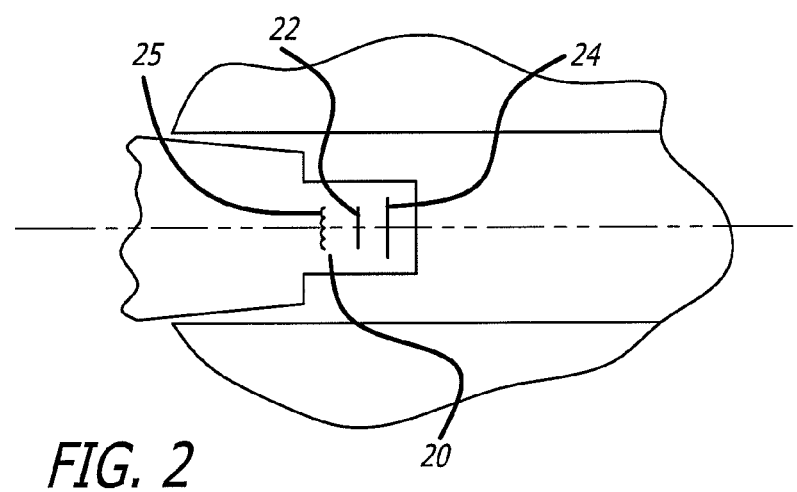
FIG. 2 is a top enlarged view of a head of the hard disk drive.

The disk drive 10 may include a plurality of heads 20 located adjacent to the disks 12. As shown in FIG. 2 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux. The head 20 may be a perpendicular recording head. The head 20 may also include a heater element 25. Such heads are commonly referred to as fly on demand ("FOD") heads.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 3:
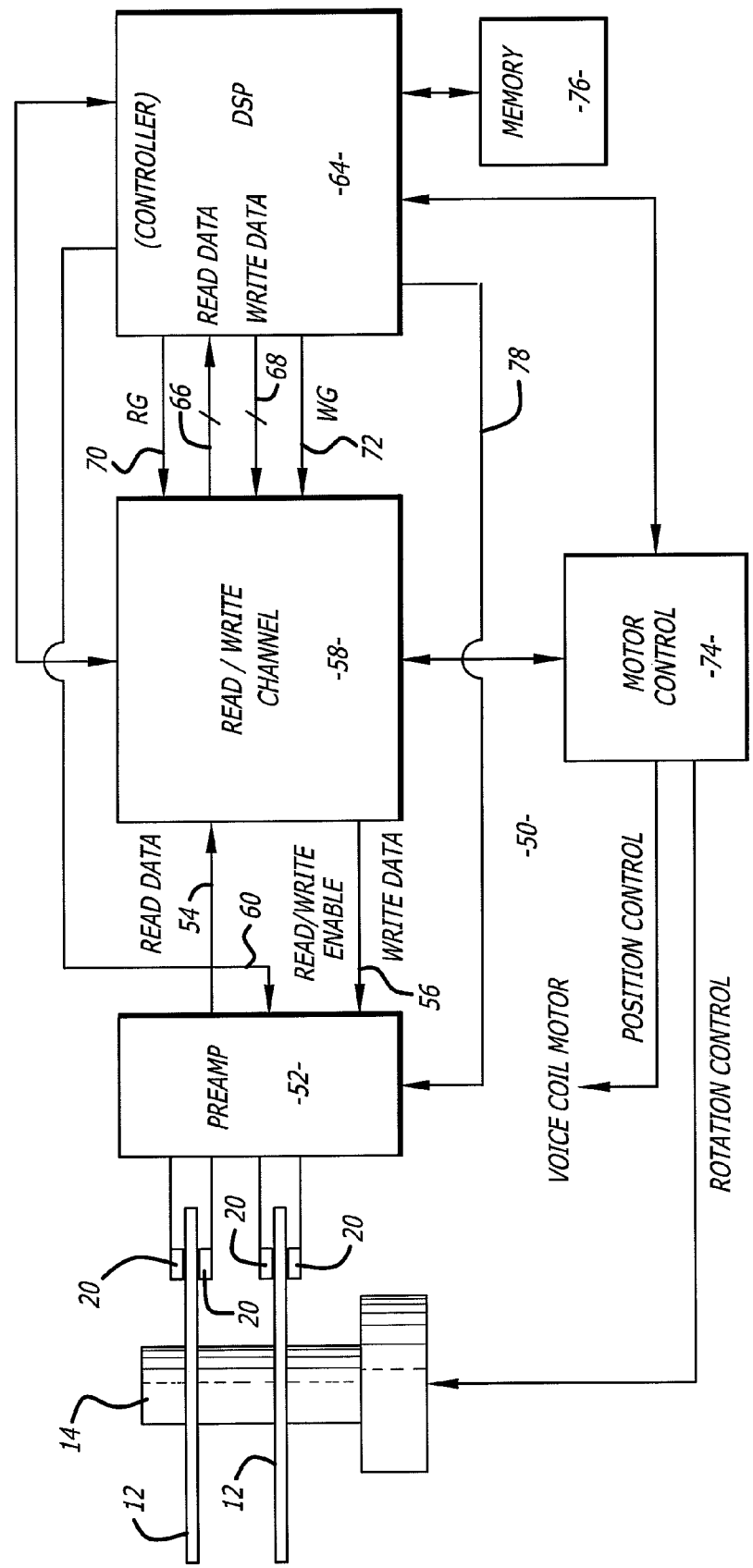
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the instructions to operate the controller and disk drive. Alternatively, the controller may have embedded firmware to operate the drive.

Figure 4:
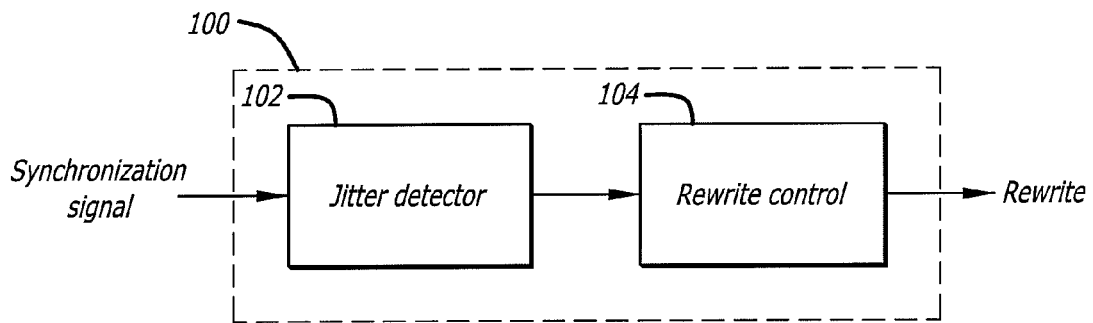
FIG. 4 is a schematic showing function blocks of a circuit that detects vibration and controls a write operation.

FIG. 4 is a schematic of a circuit 100 that can detect vibration and control a write operation. The circuit includes a jitter detector circuit 102 and a write control circuit 104. The jitter detector circuit 102 detects head jitter that typically represents vibration of the head with the heater element 25 of FIG. 2. The jitter detector circuit 102 can output a signal to the write control circuit 104. The write control circuit 104 can either inhibit a write operation or cause a rewrite of data.

Figure 5:
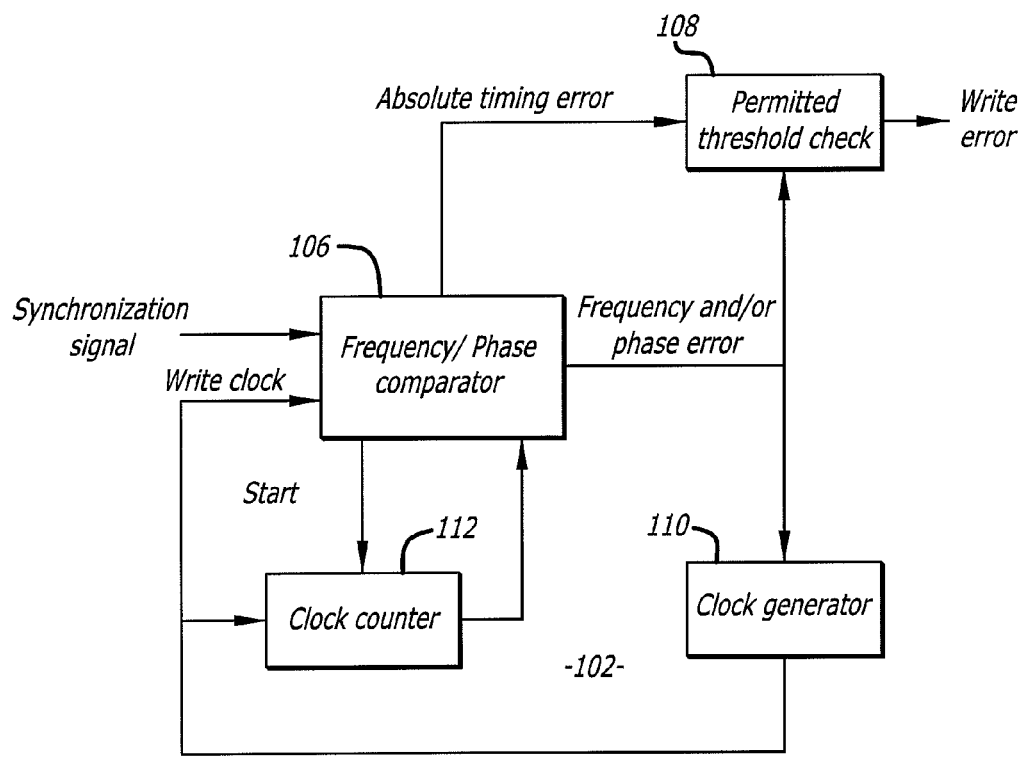
FIG. 5 is a schematic showing a vibration detection circuit.

FIG. 5 shows an embodiment of the jitter detector circuit 102. The circuit 102 includes a frequency and phase comparator 106 that is coupled to a threshold detector 108 and a clock generator 110. The comparator 106 receives a synchronization signal that is generated by the head. The disk is typically configured into tracks that may have one or more synchronization bit(s) that are read by the head and create the synchronization signal. The synchronization signal can be used to synchronize a write clock that is used to write data onto the disk.

The comparator 106 compares the synchronization signal with the write clock and generates a frequency and/or phase error signal. The frequency and/or phase error signal is provided to the clock generator 110 to synchronize the write clock with the synchronization signal in a phase lock loop configuration. The frequency and/or phase error signal is also provided to the threshold detector 108. If the frequency and/or phase error signal exceeds a threshold the detector 108 generates a write error signal. The write error signal can either inhibit a write operation, or cause a rewrite of data.

The circuit 102 may also have a clock counter 112 coupled to the comparator 106 and clock generator 110. The clock counter 112 counts a number of clock cycles between synchronization signals. The clock count is provided to the comparator 106. The comparator 106 generates an absolute timing error which corresponds to the difference between the clock count and an anticipated number of clock cycles that should exist between synchronization signals. The detector 108 generates the write error signal if the absolute timing error exceeds a threshold.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
    a disk;
    a head having a heater element that is coupled to said disk; and
    a comparator circuit that is coupled to said head with the heater element, said comparator circuit receives a synchronization signal and a write clock and generates a write error signal only if a comparison of said synchronization signal and said write clock exceeds a threshold, said comparator circuit generates an error signal and said write clock is a function of said error signal.

2. The disk drive of claim 1, wherein said write error signal inhibits a write operation.

3. The disk drive of claim 1, wherein said write error signal causes a rewrite operation.

4. The disk drive of claim 1, wherein said disk is a bit patterned media.

5. The disk drive of claim 1, wherein said comparator circuit includes a clock counter that counts a number of clock signals between at least two synchronization signals and generates said write error signal if a difference between said number of counted clock signals and an anticipated number of clock signals exceeds a threshold.

6. A hard disk drive, comprising:
    a disk;
    a head having a heater element is coupled to said disk; and,
    circuit means for receiving a synchronization signal and a write clock and generating a write error signal only if a comparison of said synchronization signal and said write clock exceeds a threshold and for generating an error signal and said write clock is a function of said error signal.

7. The disk drive of claim 6, wherein said write error signal inhibits a write operation.

8. The disk drive of claim 6, wherein said write error signal causes a rewrite operation.

9. The disk drive of claim 6, wherein said disk is a bit patterned media.

10. The disk drive of claim 6, further comprising counter means for counting a number of clock signals between at least two synchronization signals and generating said write error signal if a difference between said number of counted clock signals and an anticipated number of clock signals exceeds a threshold.

11. A method for detecting contact between a head and a disk of a hard disk drive, comprising:
    providing a synchronization signal from a head with a heater element coupled to a disk;
    providing a write clock;
    comparing the synchronization signal and the write clock;
    generating a frequency/phase error signal from the comparison of the synchronization signal and the write clock;
    generating a write error signal only if the frequency/phase error signal exceeds a threshold, and,
    adjusting the write clock as a function of the frequency/phase error signal.

12. The method of claim 11, further comprising inhibiting a write operation.

13. The method of claim 11, further comprising initiating a rewrite operation.

14. The method of claim 11, wherein the disk is a bit patterned media.

15. The method of claim 11, further comprising counting a number of clock signals between at least two synchronization signals and generating the write error signal if a difference between the number of counted clock and an anticipated number of clock signals exceeds a threshold.

* * * * *